June 16, 1953  S. W. LICHTMAN  2,642,539
GEIGER TUBE CIRCUIT WITH CATHODE FOLLOWER
Filed Dec. 27, 1950
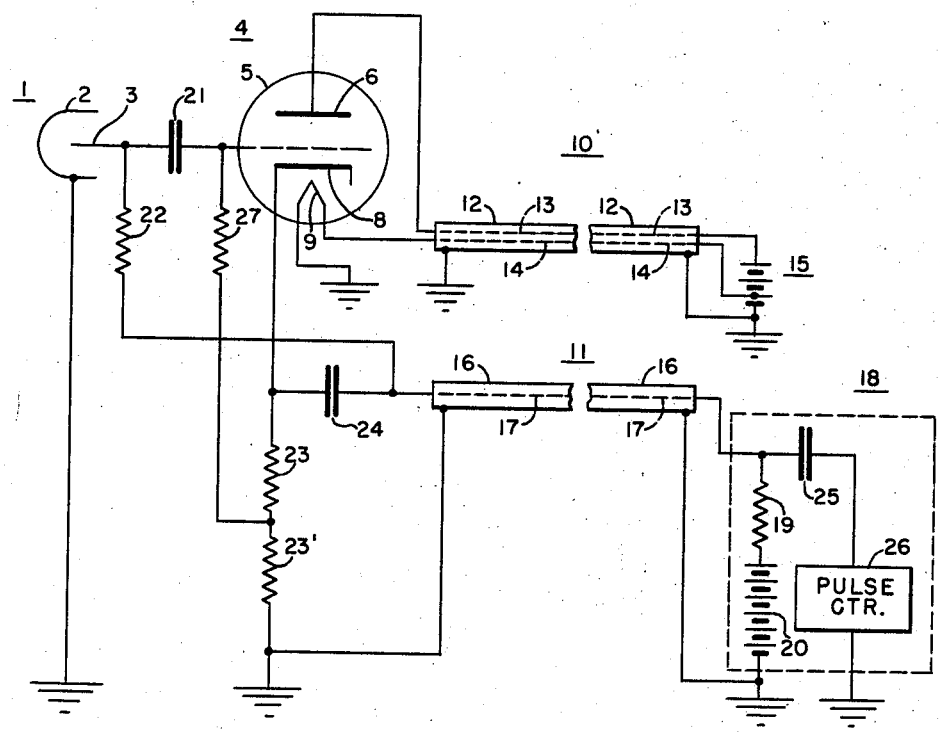
INVENTOR
SAMUEL W. LICHTMAN
BY
ATTORNEYS Patented June 16, 1953

2,642,539

UNITED STATES PATENT OFFICE 2,642,539

GEIGER TUBE CIRCUIT WITH CATHODE FOLLOWER

Samuel W. Lichtman, Oxon Hill, Md.

Application December 27, 1950, Serial No. 203,000

2 Claims. (Cl. 250—83.6)

(Granted under Title 35, U. S. Code (1952), sec. 266)

This invention relates to a novel circuit for connecting an impedance matching device and a signal source with a remotely located load device where the energizing source for the signal source is also located.

More specifically the present invention relates to a novel circuit for connecting a cathode follower amplifier and a Geiger tube or like device with a remotely located pulse counter means which also includes a source of high voltage to energize the Geiger tube.

As is well known in the art a Geiger tube is generally a small portable gas-filled tubular device for detecting the presence of radio activity. When a suitable high voltage is connected to the Geiger tube electrodes, the Geiger tube responds to the presence of energy radiations of radioactive materials by delivering short pulses of current to a load circuit coupled thereto. The number of pulses of current in a given time delivered by the Geiger tube is a measure of the strength of the radioactivity in the vicinity of the Geiger tube. The signal utilization device therefore is generally a pulse rate meter device which gives an indication of the strength of the radioactivity detected by the Geiger tube.

There are many circumstances when the small, portable Geiger tube is to be located at a point near a dangerous concentration or otherwise inaccessible source of radio-active energy while the pulse rate measuring device which gives a visual indication of the strength of the radio-activity must of necessity be located a considerable distance from the Geiger tube. Also when the pulse rate measuring device and source of energizing voltage for the Geiger tube for reasons of accuracy and sensitivity, are heavy or bulky, the pulse rate meter and high voltage source are placed at a fixed location and the relatively light, portable Geiger tube which is coupled thereto as by flexible conductor cables is moved about to various locations with facility.

The impedance offered by a Geiger tube to the circuit in which it is connected is high relative to the impedance of the conventional transmission lines which is used to couple the output of the Geiger tube to the source of high voltage and the pulse rate counter. To match the high impedance of the Geiger tube to the low impedance of the transmission line requires a suitable impedance matching device at the location of the Geiger tube which in the present disclosure is a cathode follower. In addition the transmission line must be terminated at its remote end by a proper signal load impedance which matches the impedance of the line.

It should be readily appreciated that the fewer the number of electrical conductors extending between the location of the Geiger tube and the pulse rate meter and voltage supply the more economical and reliable is the system.

Accordingly, the object of the present invention is to provide a novel circuit for connecting a cathode follower and a Geiger tube or similar signal source with a remotely located signal utilization device and energizing source for the signal source wherein the number of conductors required to interconnect the above components is a minimum.

These and other objects of the present invention will become apparent upon reference to the following specification and drawings wherein: the single figure is a schematic drawing of the instant invention.

The present invention broadly comprises an interconnection between the components of a signal transfer system consisting of a signal source and impedance matcher therefor at one location and a direct current energy supply and signal utilization device at another location whereby signals and direct current energy may be transferred between the two locations by a unitary transmission means. This interconnection consists, of course, of the unitary transmission means itself and of various additional elements to implement the purpose of the interconnection. These additional elements may, for example, be of a type to block direct current while allowing passage of signals between the transmission means and certain of the system components or conversely be of a type impeding passage of the signals while allowing passage of the direct current energy between the transmission means and certain other of the system components. The employment of the interconnection, described in detail in the discussion below, permits elimination of a separate cable for conducting direct current energy from the supply to the signal source, the safety, reliability, convenience and economy of the signal transfer system thus being promoted.

As shown in the drawings a conventional Geiger-Mueller tube 1, comprising cathode outer electrode 2 and anode inner electrode 3, is coupled to the input circuit of a well known cathode follower circuit 4. The output of the cathode follower circuit 4 is coupled to a load circuit 18 containing a signal load impedance 19 in series with a source of energizing voltage 20 for the Geiger-Mueller tube 1 through a two conductor transmission means 11. Transmission means 11 carries both the signal pulses from the output of cathode follower 4 and the energizing voltage for the electrodes 2—3 of Geiger tube 1. The anode 3 of Geiger tube 1 is connected to the inner conductor of transmission means 11 through a high impedance 22 as for example a high ohmic value resistor.

The voltages 15 for supplying the filament and plate voltage for the cathode follower circuit electron discharge device 5 are coupled by means of a three conductor transmission means 10.

The transmission means 11 is a conventional coaxial cable having an inner conductor 17 and an outer conductor 16 which is grounded to provide proper shielding and to act as a common voltage surface for the system.

Coaxial cables of the more common variety have a relatively low characteristic impedance (for example from 50-200 ohms). The impedance of most Geiger-Mueller tubes (which will hereinafter be called "Geiger tubes") is relatively high (several megohms) and in order to properly match the high impedance of the Geiger tube to the low impedance of the transmission means 11 a conventional cathode follower circuit 4 is preferably used as an impedance matching device. The characteristic of cathode followers is that they have a high input impedance and a low output impedance across the cathode impedance 23—23'.

The direct current energizing voltage source 20 used to energize Geiger tube 1 is generally a high voltage (for example 1000 volts).

Precedent to the instant invention conductor 17 of coaxial cable 11 carried only the signal voltage output of cathode follower 4 (in which case energizing voltage source 20 would not be coupled thereto as shown in the figure), and a separate coaxial conductor was needed to carry the energizing voltage to the electrodes 2—3 of Geiger tube 1. The possibility of circuit breakdown, and the expense of the system was increased by the need for two separate conductors to carry respectively the signal pulses originating in the Geiger tube and the energizing voltage for the Geiger tube.

The instant invention makes possible the utilization of a single conductive path (conductors 16—17 to carry both the signal pulse and energizing voltage between the Geiger tube 1 and the energizing voltage source and load circuit 18.

To accomplish this the source of high voltage 20, which may be any suitable high voltage source, is connected in series with the signal load impedance 19 at the remote end of coaxial cable 11. The signal load impedance 19 performs the dual function of terminating coaxial cable 11 with a proper matching impedance and of isolating the potential of the high voltage side of source 20 from the cable termination so that the signal potential may appear between the termination and ground. The signal utilization device 26, which may for example be a well known pulse rate meter used in the art to indicate the strength of the radioactivity detected by Geiger tube 1 by measuring the pulse rate thereof, is coupled across the load impedance 19 through a direct current isolating means, capacitor 25.

The inner conductor 17 of coaxial cable 11 connects to the cathode circuit resistance 23—23' of cathode follower circuit 4 through a direct current isolating means, capacitor 24, at a point near the cathode 8 of electron discharge device (triode) 5. The cathode circuit resistance 23—23' extends between cathode 8 and ground, and the output pulses from Geiger tube 1 are applied between control grid 7 of discharge device 5, through direct current isolating capacitor 21, and ground.

Resistance 27 coupled between control grid 7 of discharge device 5 and the junction of cathode circuit impedances 23—23' provides a leakage path for the charge built up on capacitance 21.

The signal pulses appearing across cathode impedance 23—23' are thus coupled to load circuit 18 where the signal pulses appearing across the load impedance are fed by capacitance 25 to pulse rate meter 26.

The energizing voltage for Geiger tube 1 is coupled to anode 3 thereof by means of a path including inner conductor 17 of coaxial cable 11 and an impedance 22 which joins conductor 17 at the terminal of isolating condenser 24 remote from cathode 8. The purpose of condensers 24 and 21 is to prevent the high positive direct current voltage from energizing voltage source 20 from appearing at the grid or cathode of discharge device 5 for reasons obvious to those skilled in the art.

The internal impedance of Geiger tube 1, being high, requires that impedance 22 which acts as the plate load for Geiger tube 1 also have a high impedance. Otherwise Geiger tube 1 would have an undesirably low signal output. The fact that impedance 22 is large also prevents any appreciable coupling of the output pulses from Geiger tube 1 to the input of coaxial line 11 through the path which includes impedance 22. The operation of the cathode follower 4 is thus unaffected by the fact that a single conductor 17 couples both the signal from the low impedance output of cathode follower to the signal utilization circuit, and direct current at high voltage from the D. C. energy supply to the high impedance Geiger tube device 1.

Direct current voltage source 15 may be any suitable direct current voltage source which provides a direct current plate voltage for discharge device 5, and also a filament voltage for filament 9.

A transmission means 10 is provided having a shielded outer conductor 12 and two inner conductors 13—14 carrying respectively the plate and filament voltage for discharge device 5.

The manner in which the plate and filament voltage of discharge device 5 is provided forms no part of the present invention.

The present invention is not limited by all of the specific details shown in the embodiment of Figure 1. For example, although the problem of feeding a high voltage through a relatively long transmission line 11 to carry both the signal and energizing voltage is present in Geiger tube applications, the present invention is also applicable to other signal generating devices where impedance matching devices are needed and both the energizing voltage therefor and the signal must be carried over relatively long transmission means.

Although a cathode follower impedance matching device is an element in the preferred embodiment of the present invention, other suitable impedance matching devices may be used without deviating from the broader, generic aspect of the present invention.

Many modifications may be made of the present invention without deviating from the scope of the broader aspects of the present invention.

The invention described herein may be manufactured and used by or for the Government of the United States of America for governmental purposes without payment of any royalties thereon or therefor.

What is claimed is:

1. In a signal transfer system having at a first location a high internal impedance signal producing tube with an anode, a signal utilization device at a second location remote from the first, and a two-conductor low characteristic impedance line linking said locations, the combination comprising: a high impedance resistor directly connected between a first of the line conductors and said tube anode, an impedance matcher at said first location with a high impedance signal input and a line impedance matching signal output respectively coupled solely through capacitors to said tube anode and said first conductor, a high voltage direct current energy supply at said second location, and a line impedance matching resistor and a capacitor solely coupling respectively said supply and said device to said first conductor, the other line conductor providing a return path for currents flowing through said first conductor.

2. In a signal transfer having at a first location a signal producing Geiger tube with an anode, a signal utilization device at a second location remote from the first, and a low characteristic impedance coaxial line with an inner and outer conductor linking said locations, the combination comprising; a high impedance resistor directly connected between said inner conductor and said Geiger tube anode, a cathode follower at said first location having a grid, a cathode and a line impedance matching cathode resistor, said grid and cathode being respectively solely coupled through capacitors to said Geiger tube anode and said inner conductor, a high voltage direct current energy supply at said second location, and a line impedance matching resistor and a capacitor solely coupling respectively said supply and said device to said inner conductor, the outer conductor of said coaxial line providing a return path for currents flowing through said inner conductor.

SAMUEL W. LICHTMAN.

References Cited in the file of this patent

UNITED STATES PATENTS

| Number | Name | Date |
| --- | --- | --- |
| 2,277,000 | Bingley | Mar. 17, 1942 |
| 2,321,295 | Howell | June 8, 1943 |
| 2,493,536 | Herzog | Jan. 3, 1950 |
| 2,503,909 | Hollingsworth | Apr. 11, 1950 |
| 2,525,491 | Lawson | Oct. 10, 1950 |